United States Patent
Budzinski et al.

(10) Patent No.: US 8,849,447 B2
(45) Date of Patent: Sep. 30, 2014

(54) METHOD AND SYSTEM FOR CONTROLLING PRODUCTION OF ITEMS

(75) Inventors: Joao Augusto Scheid Budzinski, Chavannes (CH); Philippe Amon, Aubonne (CH); Myron Seto, Rue (CH)

(73) Assignee: Sicpa Holding SA, Prilly (CH)

( * ) Notice: Subject to any disclaimer, the term of this patent is extended or adjusted under 35 U.S.C. 154(b) by 989 days.

(21) Appl. No.: 12/934,249

(22) PCT Filed: Oct. 14, 2008

(86) PCT No.: PCT/IB2008/002713
§ 371 (c)(1),
(2), (4) Date: Dec. 23, 2010

(87) PCT Pub. No.: WO2009/118583
PCT Pub. Date: Oct. 1, 2009

(65) Prior Publication Data
US 2011/0093109 A1    Apr. 21, 2011

(30) Foreign Application Priority Data
Mar. 25, 2008    (BR) .................................. PI 0800754

(51) Int. Cl.
  *G06F 7/00* (2006.01)
  *G06Q 10/06* (2012.01)
  *G06K 9/64* (2006.01)
(52) U.S. Cl.
  CPC . *G06K 9/64* (2013.01); *G06Q 10/06* (2013.01)
  USPC ............. 700/225; 700/95; 700/115; 700/214; 705/29

(58) Field of Classification Search
  USPC ............... 700/95, 107, 115, 214, 225; 705/29
  See application file for complete search history.

(56) References Cited

U.S. PATENT DOCUMENTS

| | | | |
|---|---|---|---|
| 6,332,573 B1 | 12/2001 | Gu et al. | |
| 6,363,366 B1 | 3/2002 | Henty | |
| 7,182,259 B2 | 2/2007 | Lubow et al. | |
| 7,319,990 B1 | 1/2008 | Henty | |
| 7,957,824 B2 * | 6/2011 | Boronvinskih et al. | ......... 700/95 |
| 2001/0032138 A1 | 10/2001 | Janiak et al. | |
| 2001/0038709 A1 | 11/2001 | Bett et al. | |

(Continued)

FOREIGN PATENT DOCUMENTS

| | | |
|---|---|---|
| EG | 2008071304 | 7/2008 |
| EP | 1001393 | 5/2000 |

(Continued)

OTHER PUBLICATIONS

English language translation of Bolivian Office action conducted in counterpart Bolivian Appln. No. 291-2009 (Mar. 6, 2013).

(Continued)

*Primary Examiner* — Mohammad Ali
*Assistant Examiner* — Sheela S Rao
(74) *Attorney, Agent, or Firm* — Greenblum & Bernstein, P.L.C.

(57) ABSTRACT

The invention relates to a method for controlling a production of items on a production line, wherein a digital image of each of said items is processed so as to obtain at least identified product type data and identified item data, said identified product type data and identified item data being further used for determining a reliable production volume per product type and per associated item.

70 Claims, 2 Drawing Sheets

(56) References Cited

U.S. PATENT DOCUMENTS

| | | | |
|---|---|---|---|
| 2002/0020748 | A1 | 2/2002 | Gu et al. |
| 2003/0080191 | A1 | 5/2003 | Lubow et al. |
| 2003/0158795 | A1 | 8/2003 | Markham et al. |
| 2004/0228526 | A9 | 11/2004 | Lin et al. |
| 2005/0082376 | A1 | 4/2005 | Lubow et al. |
| 2006/0086791 | A1* | 4/2006 | Austin .......................... 235/385 |
| 2006/0091220 | A1 | 5/2006 | Fukui et al. |
| 2006/0175401 | A1 | 8/2006 | Roberts |
| 2006/0237534 | A1 | 10/2006 | Junger et al. |
| 2007/0145142 | A1 | 6/2007 | Lubow et al. |
| 2009/0129668 | A1 | 5/2009 | Chi |

FOREIGN PATENT DOCUMENTS

| | | |
|---|---|---|
| EP | 1 134 679 | 9/2001 |
| EP | 1134679 | 9/2001 |
| EP | 1533749 | 5/2005 |
| EP | 1791079 | 5/2007 |
| JP | 6-282705 | 10/1994 |
| JP | 9-10848 | 1/1997 |
| JP | 2001-101286 | 4/2001 |
| JP | 2002-244715 | 8/2002 |
| JP | 2003-067031 | 3/2003 |
| JP | 2006-79175 | 3/2006 |
| JP | 2007-78897 | 3/2007 |
| RU | 2004116080 | 10/2005 |
| RU | 2008133016 | 2/2010 |
| TW | 200524399 | 7/2005 |
| TW | 200818032 | 4/2008 |
| WO | 2002/101638 | 12/2002 |
| WO | 00/42960 | 5/2004 |
| WO | 2007/116543 | 10/2007 |
| WO | WO-2009/118583 | 10/2009 |

OTHER PUBLICATIONS

Georgian Search report and Documentary Conclusion issued with respect to counterpart Georgian Appln. No. AP 2008 011975 (Nov. 5, 2012) (with English language translation).

Colombian Office action conducted in counterpart Colombia Appln. No. 10122835 (Nov. 27, 2012) (with Redacted letter summarizing action).

Egyptian Office action conducted in counterpart Egypt Appln. No. 1592/2010 (Dec. 13, 2012)( with Redacted letter summarizing action).

Egyptian Office action conducted in counterpart Egypt Appln. No. 1529/2010 (Dec. 13, 2012)( with Redacted letter summarizing action).

New Zealand Office action conducted in counterpart New Zealand Appln. No. 588301 (Mar. 15, 2012).

Bolivian Office action conducted in counterpart Bolivia Appln. No. 291-2009 (Sep. 11, 2012).

African Regional Intellectual Property Office (ARIPO) Office action conducted in counterpart ARIPO Appln. No. AP/P/2010/005434 (Mar. 18, 2013).

Saudi Arabia Office action conducted in counterpart Saudi Arabian Appln. (no art cited).

Colombia Office action conducted in counterpart Colombian Application (Jun. 24, 2013).

Egypt Office Action conducted in Egypt Appln. No. 1592/2010.

Egypt Office Action conducted in Egypt Appln. No. 1592/2010D1.

Australia Office Action conducted in Australian Appln. No. 2008353346 (Oct. 22, 2013).

European Search Report from counterpart European Appln. No. 111 84 842.0-2218 (Nov. 30, 2011).

English language translation of Japanese Office action conducted in counterpart Japanese Appln. No. 2011-224448 (Jan. 29, 2013).

International Search Report and Written Opinion for PCT/IB2008/002713 mailed Feb. 12, 2009.

International Preliminary Report on Patentability for PCT/IB2008/002713 mailed Sep. 28, 2010.

Japan Office Action conducted in counterpart Japan Appln. No. 2011-224448 (Dec. 3, 2013) (w/ English language translation).

Colombia Office Action conducted in counterpart Colombian Appln. No. PCT/10-122835 (Sep. 27, 2013) (w/ partial English language translation).

Taiwan Office Action conducted in counterpart Taiwan Appln. No. 098131831 (Jun. 18, 2014) (w/ English language translation).

* cited by examiner

METHOD AND SYSTEM FOR CONTROLLING PRODUCTION OF ITEMS

RELATED APPLICATIONS

This application is the U.S. National Stage of PCT International Application Number PCT/IB2008/002713, filed Oct. 14, 2008, which claims Paris Convention priority of Brazilian Patent Application Number PI 0800754-3, filed Mar. 25, 2008. The entire contents of the foregoing are incorporated herein by reference.

TECHNICAL FIELD

The present application relates to the technical field of control systems for automated production lines. More particularly, the invention relates to fully automated control systems for determining a production volume of items (i.e. products and/or packages) on a production line. The invention also relates to a method and a system for authenticating items.

BACKGROUND OF THE INVENTION

In conventional control systems for automatic production volume estimation of items (bottles or cans for example) produced on a production line, the items carried along a transport path (on a conveyor, for example) are detected and counted, and encoded identification data included on each item is read out and decoded so as to identify each counted item. Sometimes, the encoded identification data is a barcode (a UPC, "Universal Product Code", for example), including data corresponding to a product type and item identification information (for example, a bottle of beer of 33 cl of a certain brand). More generally, the encoded identification data include data corresponding to product type identification information. Other examples of such product type identification data are identifiers like SKU ("Stock Keeping Unit"), EAN ("European Article Number"), GTIN ("Global Trade Item Number"), APN ("Australian Product Number") etc., which are well known to the skilled persons in the field of item identification. Based on the count value and on the read out product type and item identification information, the control system determines a production volume per product type and per item.

Such spreading of production volume according to product type and item type is necessary for correctly controlling a production volume, in particular for the purpose of taxation of goods.

However, as a consequence of errors, defects or frauds, encoded identification data on such items is not always reliable. For example, a barcode label corresponding to a bottle of 33 cl may be erroneously or fraudulently affixed onto a bottle of one liter. Errors may also be due to the own motion of the items on the line. For example, contrary to bottling lines, whereon the rotation of the bottles is generally precisely controlled (to make the label applicator correctly affix the labels onto the bottles), on canning lines it is more difficult to precisely control the rotation of the cans, because the cans are in contact with each other, and thus barcode reading errors can more frequently occur. Moreover, said problem worsens as the number of different types of items to be handled by a same production line increases.

This non-reliability may be one of the causes of considerable errors in production volume control, and the amount of taxes due for a production volume may well be underestimated. Moreover, even if the product type and item identification information are the correct ones, other information like tracing data may lack or may be wrong. This latter information is not only important for tax perceiption, but also for tracking purposes, against counterfeit goods. The lack of reliability of conventional item information makes that conventional control systems for automatic production volume estimation are not capable to always correctly assess the production volume per product type and per item. Also, the lacking reliability of tracing data makes difficult any further control of the produced items (for example, after the item has left the production line).

SUMMARY OF THE INVENTION

In view of the above limitations of the known state of the art, there is a need for a control system for the fully automated production volume estimation of every single item produced on a production line. The control system should be operable to control, and to precisely and reliably count the produced items, even in case where the items are in contact with each other, so as to reliably determine the production volume per product type and per item. There is also a need for a control system operable to control and/or provide reliable tracing data for the items produced on a production line.

An object of the invention is therefore to meet the above mentioned needs.

In order to reliably assess a production volume, a first main aspect of the invention relates to a method for controlling a production of items on a production line by means of control data comprised on each of said items, said control data including encoded identification data and a brand pattern, the encoded identification data including data corresponding to associated product type identification information and item identification information, the method comprising the steps of:

counting the items on the production line so as to obtain count data;
  reading out and decoding encoded identification data on an item on the production line so as to obtain the corresponding associated product type identification information and item identification information;
  said method being characterized by further comprising the steps of:
  acquiring a digital image of said item on the production line;
  detecting a brand pattern in the acquired digital image and identifying a product type corresponding to the detected brand pattern so as to obtain identified product type data;
  identifying the item in said acquired digital image so as to obtain identified item data;
  checking if the identified product type data and the identified item data match the corresponding associated product type identification information and item identification information; and
  in case of matching, determining from said count data, product type identification information, and item identification information, a production volume per product type and per associated item.

Thus, according to said first main aspect of the invention, the encoded identification information, which is read out on a counted item (as known in the art), is further checked against identification information acquired and determined independently through image processing of a digital image of said item on the production line. As a result, the above specific combination of steps provides reliable data for the production volume determination.

The identification step of both the product type and the item based on image processing of a digital image of the item, may be performed by known techniques. Indeed, imaging devices are of common use for controlling production on automated production lines. For example, on bottling lines, strobe light (using LED lighting unit controlled by a laser trigger device, for example) illuminates bottles transported on a conveyor, and digital cameras take digital images of the so illuminated bottles, image processing means then automatically detect an outline of the bottles on these digital images and identify different types of bottles (from their shape and/or dimensions) present on the conveyor. Such identification is used, for example, for correctly labeling the bottles according to their type (shape or content, etc.).

Conventional image processing means can also detect colors printed on labels comprised on a packaging of the item or on the item itself (for example, on the bottles produced on a bottling line), or directly printed on the item, e.g. a container (for example, on cans produced on a canning line), so as to allow packaging inspection and/or pattern identification (for example, identifying brand pattern by matching with a template image). In fact, there are many known techniques relating to image retrieval and processing (in the field of content-based image retrieval) which can be used for identifying (or inspecting) an item from its digital image.

As an example, US patent application US 2004/0218837 A1 discloses image processing technique of performing a similar image retrieval process wherein a digital image of an item is first segmented into blocks, and for each block a color histogram and a brightness (luminance) histogram are determined. An average brightness is further determined from the brightness histogram, for each block, as a brightness feature information, and a representative color (for example, an average color) is determined from the color histogram, for each block, as a color feature information. Then, a comparison between color feature information of the digital image and color feature information of a target comparison image is performed (on a block-by-block basis) to decide whether the digital image is similar to the target image. If the comparison of colors is not conclusive, a further comparison between color feature information of the digital image and color feature information of the target comparison image is performed (also on a block-by-block basis).

As another example, US patent application US 2004/0228526 A9 discloses a system for color characterization using "fuzzy pixel classification" with application in color matching and color match location. This system uses color feature vectors for measuring similarity between color images, based on a distance between color feature vectors, and for locating regions of a target image of which color information matches that of a template image. A color feature vector is herein constituted by the percentage of pixels assigned to each bin (i.e. color category) of a HSL ("Hue Saturation Luminance") color histogram of the target image based on HSL values of the respective pixels (i.e. each bin corresponding to values of hue, saturation and luminance), a pixel having a weight fractionally distributed across a plurality of bins, according to a "fuzzy membership function" of a "fuzzy pixel classification".

The above mentioned illustrative examples allow realizing the identification step of the method of the invention, by recognizing a brand pattern (and identifying a corresponding product type and an item) from a digital image of the item on a production line.

It is furthermore possible to use digital images obtained not only from the visible spectrum, but also from other parts of the electromagnetic spectrum (UV or IR spectral ranges for example), by attributing different colors to different parts of this spectrum (i.e. forming "false" color images), and then using a sort of HSL representation based on the attributed colors for the pixels of the digital image. In the general case, the color values used in the present invention need thus not to correspond to the three-dimensional CIELAB representation of human color vision, but can be based on arbitrary spectral bands selected from the UV, visible and IR parts of the item's reflection spectrum. Any number of such spectral bands can furthermore be selected.

The invention may further include a step of issuing an identification error information, in case any of said identified product type data and identified item data do not match the corresponding associated product type identification information and item identification information. Thus, an error in the control data, or a fraud (by including on the item encoded identification data not corresponding to the item and/or the product type), can be reported.

Another aspect of the invention is to allow the identification of items which are close together or even in contact. The invention indeed allows to suppress possible "overlapping" effects due to the presence, on a same digital image, of pixel data relating to two or more items (which were in the view field when the digital image was acquired). According to the invention, the acquired digital image may indeed be restricted to a control area comprised within an apparent outline of the item. This aspect of the invention allows identifying items on a production line even if they are in contact. If the digital image is restricted to be that of a control area within the apparent limits of the item, there is no overlapping on the image between data corresponding to two or more items (even if they are in contact); the digital image is the one of portion of a single item. Bottling lines or canning lines are well known examples of production lines wherein the items (i.e. bottles or cans) are typically transported aligned on a conveyor, two consecutive items being in contact with each other. For example, in case the item is a cylindrical can standing vertically on a conveyor, the control area may be a mere strip on the cylindrical surface of the can.

There are many possibilities for performing such restriction of the digital image. For example, it is possible to detect an outline of the item on the digital image and eliminate the pixels which are not within said outline.

In another example, the restriction is obtained by framing the digital image and not taking into account pixel data from outside said frame (the frame corresponding to a contour of the control area). In still another example, a mask (or any means for restricting the overall view field) may be used when acquiring the digital image, so that the pixels on the digital image only relate to the control area on the item. As a result, the content of the digital image in fact relates to only one single item.

Another aspect of the invention relates to the inclusion of tracing data on items, so as to allow a further control of items produced on the production line.

Accordingly, the invention may further comprise a step of including encoded tracing data on the item, said encoded tracing data including data corresponding to said identified product type data and identified item data. Said tracing data is reliable, as it is independently determined through digital image processing of the acquired image of the item. Said encoded tracing data may further include said encoded identification data. Also, said encoded tracing data may further include data corresponding to at least one of a production date, a line identification, and a manufacturer identification (for enhanced tracing).

Alternatively, the invention may further comprise a step of including encoded tracing data on the item, but with said encoded tracing data merely comprising data corresponding to a product type and at least one of a production date, a line identification, and a manufacturer identification. Of course, said encoded tracing data may further include said encoded identification data.

In the method according to the first main aspect of the invention, encoded tracing data may already been comprised on the item and include data corresponding to at least one of a production date, a line identification, and a manufacturer identification.

Whatever alternative is considered, the invention may further comprise the step of reading out and decoding said encoded tracing data on the item, so as to obtain corresponding tracing information. It is thus possible, for example, to check a matching between identified data (by image processing) and identifying data (comprised on the item), even after the item has left the production line (for example, an agent equipped with a suitable reader may proceed to such verification on already distributed items). Of course, any other tracing information may also be checked by the agent.

According to a further aspect of the invention, the encoded tracing data may be included in a data matrix which is printed on the item. This makes any further checking of tracing data more easy and secure.

The invention according to any of the above aspects, wherein the encoded tracing data comprises at least one of a production date, a line identification, and a manufacturer identification, may comprise the further step of creating a file report on the basis of the production volume per product type and per associated item, and the tracing information, said file report indicating for each product type and each item, and the at least one of a production date, line identification, and manufacturer identification, the corresponding production volume. This aspect of the invention allows an easy control of both the production volume and the corresponding tracing information, and to spread the production volume more finely according to the tracing information. It is also easier, for example, to check for consistency between item data originating from a previous production line and items data of the current production line.

In order to keep a trace of any problem encountered when reading out tracing data (for further inquiry, for example), which could affect the reliability of these data, the invention according to its previous aspect may further comprise the steps of checking the readability of the encoded tracing data on the item, and including an error message in the file report if a reading error is detected.

In case said item on the production line further comprises a material-based security element, the invention according to any of the above aspects may comprise a further step of authenticating said material-based security element. This authentication of the security element greatly improves the reliability of the control data on the item, and in consequence the reliability of the determined production volume. For example, the material-based security element can be a luminescent marker, a forensic marker, an IR-absorber, a magnetic material, an optically variable material or a light-polarizing material, or combinations thereof, all well known to the skilled person in the art of security printing.

The invention may also comprise a step of applying a material-based security element on said item, wherein said encoded tracing data is supported by said material-based security element. According to this aspect of the invention, one more security level is added on the production line, as the tracing data is now securized. Of course, a further step of authenticating said material-based security element may be included, for improving the reliability of the encoded tracing data.

In the above alternative aspects of the invention, wherein authentication of the material-based security element is performed, a further step of issuing an authentication error information may be included, in case said security element is not authenticated.

The invention, in all its various aspects, in fact concerns any type of item produced on production lines. Particularly, the invention has been successfully tested on beverage containers (for example, bottles or cans). Also, the digital images to be processed may, for example, correspond to any one of an area on a label, an imprint, and a sleeve on the item.

The invention also concerns a control system for controlling a production of items on a production line, operable to implement the steps of the above method according to first main aspect of the invention, in any of its variants, as defined in the appended claims.

Thus, the invention also generally relates to a control system for controlling a production of items on a production line by means of control data comprised on each of said items, said control data including encoded identification data and a brand pattern, the encoded identification data including data corresponding to associated product type identification information and item identification information, the control system comprising:

a counting unit operable to count the items on the production line so as to obtain count data and transmit the obtained count data;

a first reader operable to read out and decode encoded identification data on an item on the production line, so as to obtain the corresponding associated product type identification information and item identification information, and transmit the obtained associated product type identification information and item identification information; and a control unit operable to receive count data from the counting unit and associated product type identification information and item identification information from the first reader, said control system further comprising:

an imaging unit operable to acquire a digital image of said item on the production line and transmit said digital image;

an image processing unit operable to:

receive the digital image from the imaging unit, detect a brand pattern in the received digital image, and identify a product type corresponding to the detected brand pattern, so as to obtain identified product type data;

identify the item in said received digital image so as to obtain identified item data; and transmit said obtained identified product type data and identified item data to the control unit, wherein said control unit is further operable to:

receive from the image processing unit the identified product type data and the identified item data;

check if the received identified product type data and identified item data match the corresponding received associated product type identification information and item identification information; and in case of matching, determine from said received count data, product type identification information and item identification information a production volume per product type and per associated item, and store said production volume in a database.

Said imaging unit may be a digital camera (a CCD or CMOS camera). However, an analog camera may also be used, if supplemented with a framegrabber analog-to-digital converter so as to produce a digital image format. The control system may also comprise an illumination unit coupled to the imaging unit for illuminating the item with strobe light. A conventional example of such an illumination unit is an LED lighting unit (for visible light) or a laser strobe. Other types of illumination units allow illuminating items over a broader spectrum (for example, ranging from UV to IR light, i.e. from 300 nm to 2500 nm). Of course, the control unit is operable to control the illumination unit, the imaging unit, and the image processing unit so as to synchronize their operation for illuminating the item, forming the digital image of the illuminated item, and processing said digital image.

Classically, the control system may further comprise: sensor means operable to detect a location of the item relative to the imaging unit, at which said imaging unit is operable to form a digital image of the item, and to transmit a trigger signal indicating the detection of said location, wherein the control unit is further operable to receive the trigger signal from the sensor means and to synchronize the operation of the illumination unit, imaging unit, and image processing unit based on said received trigger signal. Typically, the sensor means may be a laser trigger for high speed photography. This well known device allows very precise triggering of the imaging unit and is particularly adapted for production lines, such as canning lines or bottling lines, wherein a production rate as high as 1200 items per minute is possible.

The control unit of the above control system may further be operable, if any of said identified product type data and identified item data do not match the corresponding associated product type identification information and item identification information, to issue a corresponding identification error information and store said issued identification error information in the database. Moreover, the imaging unit may be operable to acquire a digital image which is restricted to a control area within an apparent outline of the item, thereby allowing to identify items which are in contact on the production line.

The control system may further comprise a coding unit operable to include encoded tracing data on the item on the production line, and said encoded tracing data may include data corresponding to said identified product type data and identified item data. The encoding data may further include the encoded identification data and/or may further include data corresponding to at least one of a production date, a line identification, and a manufacturer identification. According to the first main aspect of the control system of the invention, encoded tracing data may already been comprised on the item and include data corresponding to at least one of a production date, a line identification, and a manufacturer identification. Also, the control system may further comprise a second reader operable to read out and decode said encoded tracing data included on said item so as to obtain corresponding tracing information, and transmit the obtained tracing information to the control unit, the control unit being operable to receive the transmitted tracing information and store it in the database.

The coding unit of the control system may further be operable:
  to print a data matrix including the encoded tracing data on the item, and/or
  to create a file report on the basis of the production volume per product type and per associated item, and the tracing information stored in the database, said file report indicating for each product type and each associated item, and the at least one of production date, line identification, and manufacturer identification, the corresponding production volume; and/or
  to check the readability of the encoded tracing data by the second reader, and, if a reading error is detected, to issue an error message and include it in the file report.

As already explained for the corresponding method, in the above control system, wherein said item may further comprise a material-based security element, further authenticating means may be operable to detect and authenticate said material-based security element, and transmit a corresponding authentication result information to the control unit.

According to the invention, the control system may comprise means operable to apply a material-based security element on the item, the above mentioned encoded tracing data being supported by said material-based security element. Moreover, the control system may comprise authenticating means operable to detect and authenticate said material-based security element, and transmit a corresponding authentication result information to the control unit. Also, in case the above authentication result information indicates that the authenticating means failed to authenticate said material-based security element, the control unit is operable to issue an authentication error message and store it in the database.

A second main aspect of the invention, which constitutes an alternative solution to the technical problem of reliably determining a production volume per product type and per item, relates to a method for controlling a production of items on a production line by means of control data comprised on each of said items, said control data including a brand pattern, the method comprising the steps of:
  counting the items on the production line so as to obtain count data;
  acquiring a digital image of an item on the production line;
  detecting a brand pattern in the acquired digital image and identifying a product type corresponding to the detected brand pattern so as to obtain identified product type data;
  identifying the item in said acquired digital image so as to obtain identified item data; and
  determining from said count data, identified product type data, and identified item data a production volume per product type and per associated item.

Thus, according to said second main aspect of the invention, which is well adapted to items having no specific control data, identification of an item is determined by image processing of a digital image of said item on the production line. As a result, the above specific combination of steps provides data for production volume determination which are reliable.

In a further method according to the above second main aspect of the invention, said acquired digital image is restricted to a control area which is within an apparent outline of the item.

In a further method according to the above second main aspect of the invention, further comprising a step of including encoded tracing data on the item, said encoded tracing data is including data corresponding to said identified product type data and identified item data.

In a further method according to the above second main aspect of the invention, said encoded tracing data further includes data corresponding to at least one of a production date, a line identification, and a manufacturer identification.

In a further method according to the above second main aspect of the invention, further comprising a step of including encoded tracing data on the item, said encoded tracing data is comprising data corresponding to a product type and at least one of a production date, a line identification, and a manufacturer identification.

In a further method according to the second main aspect invention, encoded tracing data may already been comprised on the item and include data corresponding to at least one of a production date, a line identification, and a manufacturer identification.

A further method according to the above second main aspect of the invention, further comprises the step of reading out and decoding said encoded tracing data on the item so as to obtain corresponding tracing information.

In a further method according to the above second main aspect of the invention, the encoded tracing data is included in a data matrix which is printed on the item.

A further method according to the above second main aspect of the invention, comprises the further step of creating a file report on the basis of the production volume per product type and per associated item, and the tracing information, said file report indicating for each product type and each item, and the at least one of production date, line identification, and manufacturer identification, the corresponding production volume.

A further method according to the above second main aspect of the invention, comprises the steps of checking the readability of the encoded tracing data on the item, and including an error message in the file report if a reading error is detected.

In a further method according to the above second main aspect of the invention, said item further comprises a material-based security element, and the method comprises a further step of authenticating said material-based security element.

A further method according to the above second main aspect of the invention, comprises a step of applying a material-based security element on said item, wherein said encoded tracing data is supported by said material-based security element.

A further method according to the above second main aspect of the invention, further comprises a step of authenticating said material-based security element.

In a further method according to the above second main aspect of the invention, in case said material-based security element is not authenticated, a corresponding authentication error information is issued.

In a further method according to the above second main aspect of the invention the item is a beverage container.

In a further method according to the above second main aspect of the invention the digital image corresponds to any one of an area on a label, an imprint, and a sleeve on the item.

The invention according to its second main aspect also comprises a corresponding control system for controlling a production of items on a production line by means of control data comprised on each of said items, said control data including a brand pattern, the control system comprising:
a counting unit operable to count the items on the production line so as to obtain count data and transmit the obtained count data;
a control unit operable to receive count data from the counting unit;
an imaging unit operable to acquire a digital image of said item on the production line and transmit said digital image;
an image processing unit operable to:
receive the digital image from the imaging unit, detect a brand pattern in the received digital image, and identify a product type corresponding to the detected brand pattern, so as to obtain identified product type data;
identify the item in said received digital image so as to obtain identified item data; and
transmit said obtained identified product type data and identified item data to the control unit,
wherein said control unit is further operable to:
receive from the image processing unit the identified product type data and the identified item data; and
determine from said received count data, product type identification information and item identification information a production volume per product type and per associated item, and store said production volume in a database.

In a further control system according to the above second main aspect of the invention, the imaging unit is operable to acquire a digital image which is restricted to a control area within an apparent outline of the item.

A further control system according to the above second main aspect of the invention, further comprises a coding unit operable to include encoded tracing data on the item on the production line, said encoded tracing data including data corresponding to said identified product type data and identified item data.

In a further control system according to the above second main aspect of the invention, said encoded tracing data further includes data corresponding to at least one of a production date, a line identification, and a manufacturer identification.

A further control system according to the above second main aspect of the invention, further comprises a coding unit operable to include encoded tracing data on the item on the production line, said encoded tracing data including data corresponding to at least one of a production date, a line identification, and a manufacturer identification.

According to the control system of the second main aspect of the invention, encoded tracing data may already been comprised on the item and include data corresponding to at least one of a production date, a line identification, and a manufacturer identification.

A further control system according to the above second main aspect of the invention, further comprises:
a second reader operable to read out and decode said encoded tracing data included on said item so as to obtain corresponding tracing information, and transmit the obtained tracing information to the control unit,
the control unit being operable to receive the transmitted tracing information and store it in the database.

In a further control system according to the above second main aspect of the invention, the coding unit is operable to print a data matrix including the encoded tracing data on the item.

In a further control system according to the above second main aspect of the invention, the control unit is operable to create a file report on the basis of the production volume per product type and per associated item, and the tracing information stored in the database, said file report indicating for each product type and each associated item, and the at least one of production date, line identification, and manufacturer identification, the corresponding production volume.

In a further control system according to the above second main aspect of the invention, the control unit is operable to check the readability of the encoded tracing data by the second reader, and, if a reading error is detected, to issue an error message and include it in the file report.

In a further control system according to the above second main aspect of the invention, said item further comprises a material-based security element, and the control system comprises authenticating means operable to detect and authenticate said material-based security element, and transmit a corresponding authentication result information to the control unit.

A further control system according to the above second main aspect of the invention, comprises means operable to apply a material-based security element on said item, said encoded tracing data being supported by said material-based security element.

A further control system according to the above second main aspect of the invention, further comprises authenticating means operable to detect and authenticate said material-based security element, and transmit a corresponding authentication result information to the control unit.

In a further control system according to the above second main aspect of the invention, in case said authentication result information indicates that the authenticating means failed to authenticate said material-based security element, the control unit is operable to issue an authentication error message and store it in the database.

In a further control system according to the above second main aspect of the invention, the item is a beverage container.

In a further control system according to the above second main aspect of the invention, the digital image corresponds to any one of an area on a label, an imprint, and a sleeve on the item.

The invention also concerns a use of the control system according to any of its embodiments for determining a production volume of items on a production line. Particularly disclosed is a use of the control system, wherein the control unit is further operable to calculate a tax amount corresponding to a determined production volume.

The invention is not limited to the specified embodiments and various modifications may be made without departing from the scope of the invention as defined by the claims. For example, the above mentioned imaging unit may be operable to acquire a plurality of digital images of a single item (corresponding to different view angles), and process each of said acquired images such as already explained for identifying the item.

The invention also includes a computer program product operable to make a computer connected to a control system for controlling a production of items on a production line, as described above, implement the steps of the method according to the invention (as described above), when running on said computer.

The present invention will be described more fully hereinafter with reference to the accompanying drawings in which like numerals represent like elements throughout the several figures, and in which prominent aspects and features of the invention are illustrated.

DETAILED DESCRIPTION OF A PREFERRED EMBODIMENT

Figure 1:
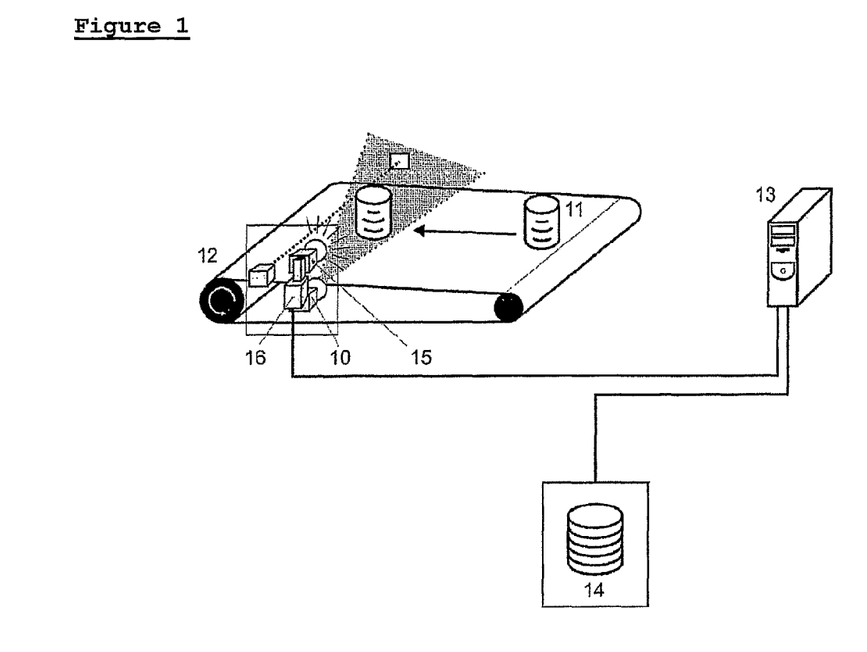
FIG. 1 illustrates an automated production line including a part of a control system for determining a production volume according to an embodiment of the invention.

In the automated production line including an example of a control system for controlling a production of items according to the invention, shown in FIG. 1, the control system comprises an imaging unit (10) for acquiring a digital image of an item (11) (here, a can is represented) on a conveyor (12) of the production line, an image processing unit (13) for processing digital images received from the imaging unit (10) and a database (14) for storing production volume data. The system may also comprise an illumination unit (15) for illuminating the item (11) with strobe light.

Figure 2:
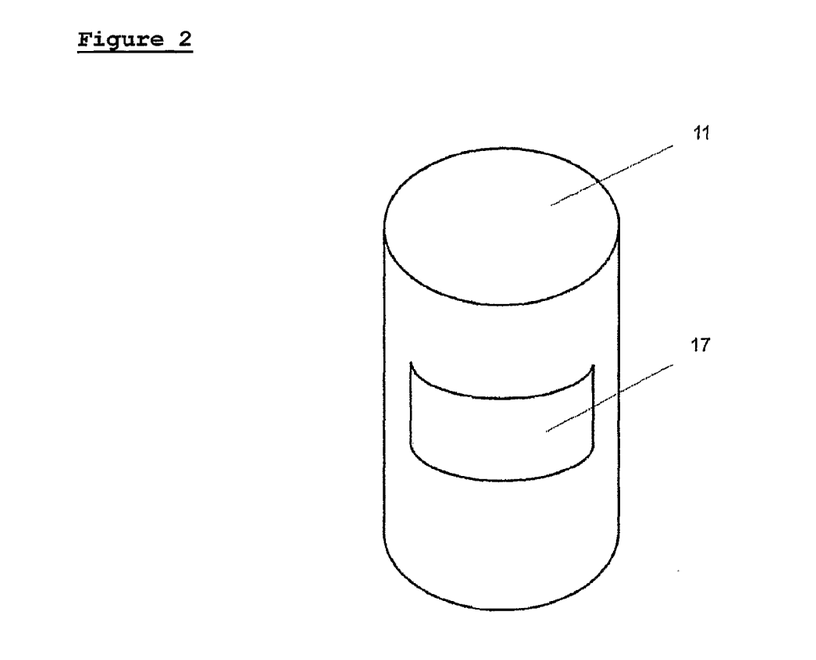
FIG. 2 illustrates a control area on an item on the production line of FIG. 1.
Figure 3:
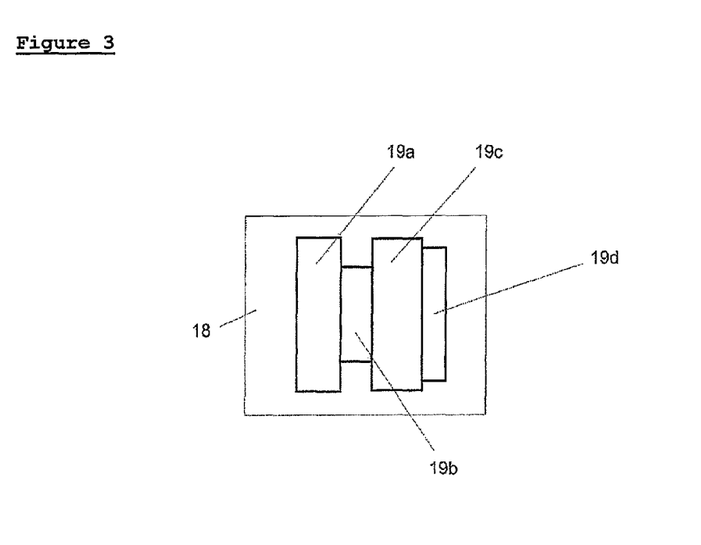
FIG. 3 illustrates a digital image of the control area of the item of FIG. 2, as taken by the imaging unit of the control system of FIG. 1.

FIG. 2 shows a control area (17) on the surface of the item (11) and FIG. 3 illustrates a digital image (18) of the control area (17) of the item (11), as taken by the imaging unit (10). The image processing unit (13) classically divides the digital image (18) received from the imaging unit (10) into a plurality of zones (19a-19d) (here four zones as an example), as represented in FIG. 3, for product type and item identification on a zone-by-zone basis by means of comparisons with the corresponding zones of template digital images (stored in the database) of reference items.

Figure 4:
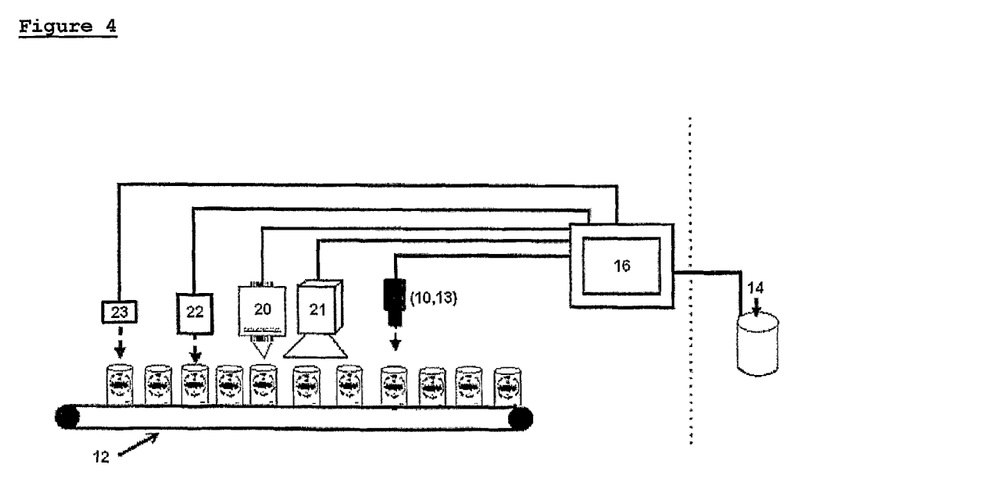
FIG. 4 is a schematic view of a control system for determining a production volume on a production line according to an embodiment of the invention.

In the example illustrated in FIG. 4, the control system comprises: a counting unit (20) for counting the items on the production line, obtaining count data and transmitting the obtained count data to a control unit (16); a first reader (21) for reading out and decoding encoded identification data on item (11) on the production line, so as to obtain the corresponding associated product type identification information and item identification information, and transmitting the obtained associated product type identification information and item identification information to the control unit (16).

The control unit (16) is operable to receive count data from the counting unit (20) and associated product type identification information and item identification information from the first reader (21). The imaging unit (10) is operable to take a digital image of said item (11) on the production line and transmits said digital image to the image processing unit (13) (in the example of FIG. 4, the imaging unit (10) and the image processing unit (13) are represented as included in a same imaging device). The image processing unit (13) is operable to receive the digital image from the imaging unit (10), detect a brand pattern in the received digital image, identify a product type corresponding to the detected brand pattern, and obtain identified product type data. The image processing unit (13) is further operable to identify the item (11) in said received digital image and obtain identified item data. The identification of the product type may be carried out by conventional techniques of digital data processing (relating to image retrieval, feature detection etc. . . ). As an example, a HSL histogram is calculated for each zone (19a-19d) of the digital image, and the number of pixels in each histogram is compared, on a bin-per-bin basis, to reference data corresponding to histograms of template items. This analysis can also be completed with conventional outline detection (thus, the detected shape of the item may be compared with stored reference shapes for type detection, for example, if the previously detected brand is "Budweiser", the shape detection further indicates a can of 33 cl). This technique allows reliably detecting the brand and associated type information concerning the item.

The image processing unit (13) then is operable to transmit said obtained identified product type data and identified item data to the control unit (16). The control unit (16) is operable to receive from the image processing unit (13) the identified product type data and the identified item data, check if the received identified product type data and identified item data match the corresponding received associated product type identification information and item identification information, and, in case of matching, determine from said received count data, product type identification information and item identification information a production volume per product type and per associated item, and store said production volume in the database (14).

The control unit (16), in case any of the identified product type data and identified item data do not match the corresponding associated product type identification information and item identification information, is operable to issue a corresponding identification error information and stores the issued identification error information in the database (14). The production volume stored in the database (14) thus only relates to authenticated items when there is no corresponding identification error information, or, in case of impossibility to authenticate the item, a corresponding identification error information from the control unit (16) is also stored in the database.

The control system also includes a coding unit (22) for including encoded tracing data on the item on the production line. The encoded tracing data includes data corresponding to the above mentioned identified product type data and identified item data (obtained via digital image processing). In this embodiment, the encoded tracing data is included on the item by means of the coding unit (22) which prints said encoded tracing data on the item, when the item transported on the conveyor (12) passes in front of the coding unit.

The control system also includes authenticating means (23) for detecting and authenticating a material-based security element (a magnetic material) which is included on the item. The authentication means (23) transmit the result of authentication to the control unit (16), which, if the item is not authenticated, issues a corresponding authentication error message and stores this message in the database.

In the foregoing are broadly outlined some of the more pertinent aspects and features of the present invention. These should be construed to be merely illustrative of some of the more prominent features and applications of the invention. The invention is nevertheless not limited to the above embodiments and various modifications may be made without departing from the scope of the invention as defined by the claims.

The invention claimed is:

1. Method for controlling a production of items on a production line by means of control data comprised on each of said items, said control data including encoded identification data and a brand pattern, the encoded identification data including data corresponding to associated product type identification information and item identification information, the method comprising the steps of:
    counting the items on the production line so as to obtain count data;
    reading out and decoding encoded identification data on an item on the production line so as to obtain the corresponding associated product type identification information and item identification information;
    said method further comprising the steps of:
    acquiring a digital image of said item on the production line;
    detecting a brand pattern in the acquired digital image and identifying a product type corresponding to the detected brand pattern so as to obtain identified product type data;
    identifying the item in said acquired digital image so as to obtain identified item data;
    checking if the identified product type data and the identified item data match the corresponding associated product type identification information and item identification information; and
    in case of matching, determining from said count data, product type identification information, and item identification information a production volume per product type and per associated item.

2. The method according to claim 1, wherein, if any of said identified product type data and identified item data do not match the corresponding associated product type identification information and item identification information, a corresponding identification error information is issued.

3. The method according to claim 1, wherein said acquired digital image is restricted to a control area which is within an apparent outline of the item.

4. The method according to claim 1, further comprising a step of including encoded tracing data on the item, said encoded tracing data including data corresponding to said identified product type data and identified item data.

5. The method according to claim 4, wherein said encoded tracing data further include said encoded identification data.

6. The method according to claim 4, wherein said encoded tracing data further includes data corresponding to at least one of a production date, a line identification, and a manufacturer identification.

7. The method according to claim 1, further comprising a step of including encoded tracing data on the item, said encoded tracing data comprising data corresponding to a product type and at least one of a production date, a line identification, and a manufacturer identification.

8. The method according to claim 7, wherein said encoded tracing data further include said encoded identification data.

9. The method according to claim 1, wherein encoded tracing data are comprised on the item and include data corresponding to at least one of a production date, a line identification, and a manufacturer identification.

10. The method according to claim 6, further comprising the step of:
    reading out and decoding said encoded tracing data on the item so as to obtain corresponding tracing information.

11. The method according to claim 4, wherein the encoded tracing data is included in a data matrix which is printed on the item.

12. The method according to claim 6, wherein
    the method comprises the further step of creating a file report on the basis of the production volume per product type and per associated item, and the tracing information, said file report indicating for each product type and each item, and the at least one of production date, line identification, and manufacturer identification, the corresponding production volume.

13. The method according to claim 12, comprising the steps of checking the readability of the encoded tracing data on the item, and including an error message in the file report if a reading error is detected.

14. The method according to claim 1, wherein said item further comprises a material-based security element, and the method comprises a further step of authenticating said material-based security element.

15. The method according to claim 4, comprising a step of applying a material-based security element on said item, wherein said encoded tracing data is supported by said material-based security element.

16. The method according to claim 15, further comprising a step of authenticating said material-based security element.

17. The method according to claim 14, wherein, in case said material-based security element is not authenticated, a corresponding authentication error information is issued.

18. The method according to claim 1, wherein the item is a beverage container.

19. The method according to claim 1, wherein the digital image corresponds to any one of an area on a label, an imprint, and a sleeve on the item.

20. Control system for controlling a production of items on a production line by means of control data comprised on each of said items, said control data including encoded identification data and a brand pattern, the encoded identification data including data corresponding to associated product type identification information and item identification information, the control system comprising:
   a counting unit operable to count the items on the production line so as to obtain count data and transmit the obtained count data;
   a first reader operable to read out and decode encoded identification data on an item on the production line, so as to obtain the corresponding associated product type identification information and item identification information, and transmit the obtained associated product type identification information and item identification information; and
   a control unit operable to receive count data from the counting unit and associated product type identification information and item identification information from the first reader,
   said control system further comprising:
   an imaging unit operable to acquire a digital image of said item on the production line and transmit said digital image;
   an image processing unit operable to:
   receive the digital image from the imaging unit, detect a brand pattern in the received digital image, and identify a product type corresponding to the detected brand pattern, so as to obtain identified product type data;
   identify the item in said received digital image so as to obtain identified item data; and
   transmit said obtained identified product type data and identified item data to the control unit,
   wherein said control unit is further operable to:
   receive from the image processing unit the identified product type data and the identified item data;
   check if the received identified product type data and identified item data match the corresponding received associated product type identification information and item identification information; and
   in case of matching, determine from said received count data, product type identification information and item identification information a production volume per product type and per associated item, and store said production volume in a database.

21. The control system according to claim 20, wherein, if any of said identified product type data and identified item data do not match the corresponding associated product type identification information and item identification information, the control unit is operable to issue a corresponding identification error information and store said issued identification error information in the database.

22. The control system according to claim 20, wherein the imaging unit is operable to acquire a digital image which is restricted to a control area within an apparent outline of the item.

23. The control system according to claim 20, further comprising:
   a coding unit operable to include encoded tracing data on the item on the production line, said encoded tracing data including data corresponding to said identified product type data and identified item data.

24. The control system according to claim 23, wherein said encoded tracing data further includes said encoded identification data.

25. The control system according to claim 23, wherein said encoded tracing data further includes data corresponding to at least one of a production date, a line identification, and a manufacturer identification.

26. The control system according to claim 20, further comprising:
   a coding unit operable to include encoded tracing data on the item on the production line, said encoded tracing data including data corresponding to at least one of a production date, a line identification, and a manufacturer identification.

27. The control system according to claim 24, wherein said encoded tracing data further include said encoded identification data.

28. The control system according to claim 20, wherein encoded tracing data are comprised on the item and include data corresponding to at least one of a production date, a line identification, and a manufacturer identification.

29. The control system according to claim 25, further comprising:
   a second reader operable to read out and decode said encoded tracing data included on said item so as to obtain corresponding tracing information, and transmit the obtained tracing information to the control unit,
   the control unit being operable to receive the transmitted tracing information and store it in the database.

30. The control system according to claim 23, wherein the coding unit is operable to print a data matrix including the encoded tracing data on the item.

31. The control system according to claim 25, wherein
   the control unit is operable to create a file report on the basis of the production volume per product type and per associated item, and the tracing information stored in the database, said file report indicating for each product type and each associated item, and the at least one of production date, line identification, and manufacturer identification, the corresponding production volume.

32. The control system according to claim 29, wherein
   the control unit is operable to check the readability of the encoded tracing data by the second reader, and, if a reading error is detected, to issue an error message and include it in the file report.

33. The control system according to claim 20, wherein said item further comprises a material-based security element, and the control system comprises authenticating means operable to detect and authenticate said material-based security element, and transmit a corresponding authentication result information to the control unit.

34. The control system according to claim 23, comprising means operable to apply a material-based security element on said item, said encoded tracing data being supported by said material-based security element.

35. The control system according to claim 34, further comprising authenticating means operable to detect and authenticate said material-based security element, and transmit a corresponding authentication result information to the control unit.

36. The control system according to claim 33, wherein, in case said authentication result information indicates that the authenticating means failed to authenticate said material-based security element, the control unit is operable to issue an authentication error message and store it in the database.

37. The control system according to claim 20, wherein the item is a beverage container.

38. The control system according to claim 20, wherein the digital image corresponds to any one of an area on a label, an imprint, and a sleeve on the item.

39. Method for controlling a production of items on a production line by means of control data comprised on each of said items, said control data including a brand pattern, the method comprising the steps of:
- counting the items on the production line so as to obtain count data;
- acquiring a digital image of an item on the production line;
- detecting a brand pattern in the acquired digital image and identifying a product type corresponding to the detected brand pattern so as to obtain identified product type data;
- identifying the item in said acquired digital image so as to obtain identified item data; and
- determining from said count data, identified product type data, and identified item data a production volume per product type and per associated item.

40. The method according to claim 39, wherein said acquired digital image is restricted to a control area which is within an apparent outline of the item.

41. The method according to claim 39, further comprising a step of including encoded tracing data on the item, said encoded tracing data including data corresponding to said identified product type data and identified item data.

42. The method according to claim 41, wherein said encoded tracing data further includes data corresponding to at least one of a production date, a line identification, and a manufacturer identification.

43. The method according to claim 39, further comprising a step of including encoded tracing data on the item, said encoded tracing data comprising data corresponding to a product type and at least one of a production date, a line identification, and a manufacturer identification.

44. The method according to claim 39, wherein encoded tracing data are comprised on the item and include data corresponding to at least one of a production date, a line identification, and a manufacturer identification.

45. The method according to claim 42, further comprising the step of:
- reading out and decoding said encoded tracing data on the item so as to obtain corresponding tracing information.

46. The method according to claim 42, wherein the encoded tracing data is included in a data matrix which is printed on the item.

47. The method according to claim 43, wherein
the method comprises the further step of creating a file report on the basis of the production volume per product type and per associated item, and the tracing information, said file report indicating for each product type and each item, and the at least one of production date, line identification, and manufacturer identification, the corresponding production volume.

48. The method according to claim 47, comprising the steps of checking the readability of the encoded tracing data on the item, and including an error message in the file report if a reading error is detected.

49. The method according to claim 39, wherein said item further comprises a material-based security element, and the method comprises a further step of authenticating said material-based security element.

50. The method according to claim 42, comprising a step of applying a material-based security element on said item, wherein said encoded tracing data is supported by said material-based security element.

51. The method according to claim 50, further comprising a step of authenticating said material-based security element.

52. The method according to claim 49, wherein, in case said material-based security element is not authenticated, a corresponding authentication error information is issued.

53. The method according to claim 39, wherein the item is a beverage container.

54. The method according to claim 39, wherein the digital image corresponds to any one of an area on a label, an imprint, and a sleeve on the item.

55. Control system for controlling a production of items on a production line by means of control data comprised on each of said items, said control data including a brand pattern, the control system comprising:
- a counting unit operable to count the items on the production line so as to obtain count data and transmit the obtained count data;
- a control unit operable to receive count data from the counting unit;
- an imaging unit operable to acquire a digital image of said item on the production line and transmit said digital image;
- an image processing unit operable to:
- receive the digital image from the imaging unit, detect a brand pattern in the received digital image, and identify a product type corresponding to the detected brand pattern, so as to obtain identified product type data;
- identify the item in said received digital image so as to obtain identified item data; and
- transmit said obtained identified product type data and identified item data to the control unit,
- wherein said control unit is further operable to:
- receive from the image processing unit the identified product type data and the identified item data; and
- determine from said received count data, product type identification information and item identification information a production volume per product type and per associated item, and store said production volume in a database.

56. The control system according to claim 55, wherein the imaging unit is operable to acquire a digital image which is restricted to a control area within an apparent outline of the item.

57. The control system according to claim 55, further comprising:
- a coding unit operable to include encoded tracing data on the item on the production line, said encoded tracing data including data corresponding to said identified product type data and identified item data.

58. The control system according to claim 57, wherein said encoded tracing data further includes data corresponding to at least one of a production date, a line identification, and a manufacturer identification.

59. The control system according to claim 55, further comprising:
- a coding unit operable to include encoded tracing data on the item on the production line, said encoded tracing data including data corresponding to at least one of a production date, a line identification, and a manufacturer identification.

60. The control system according to claim 55, wherein encoded tracing data are comprised on the item and include data corresponding to at least one of a production date, a line identification, and a manufacturer identification.

61. The control system according to claim 57, further comprising:
- a second reader operable to read out and decode said encoded tracing data included on said item so as to obtain corresponding tracing information, and transmit the obtained tracing information to the control unit, the control unit being operable to receive the transmitted tracing information and store it in the database.

62. The control system according to claim 57, wherein the coding unit is operable to print a data matrix including the encoded tracing data on the item.

63. The control system according to claim 58, wherein
the control unit is operable to create a file report on the basis of the production volume per product type and per associated item, and the tracing information stored in the database, said file report indicating for each product type and each associated item, and the at least one of production date, line identification, and manufacturer identification, the corresponding production volume.

64. The control system according to claims 63, wherein the control unit is operable to check the readability of the encoded tracing data by the second reader, and, if a reading error is detected, to issue an error message and include it in the file report.

65. The control system according to claim 55, wherein said item further comprises a material-based security element, and the control system comprises authenticating means operable to detect and authenticate said material-based security element, and transmit a corresponding authentication result information to the control unit.

66. The control system according to claim 57, comprising means operable to apply a material-based security element on said item, said encoded tracing data being supported by said material-based security element.

67. The control system according to claim 66, further comprising authenticating means operable to detect and authenticate said material-based security element, and transmit a corresponding authentication result information to the control unit.

68. The control system according to claim 65, wherein, in case said authentication result information indicates that the authenticating means failed to authenticate said material-based security element, the control unit is operable to issue an authentication error message and store it in the database.

69. The control system according to claim 55, wherein the item is a beverage container.

70. The control system according to claim 55, wherein the digital image corresponds to any one of an area on a label, an imprint, and a sleeve on the item.

* * * * *